(12) United States Patent
Loh et al.

(10) Patent No.: US 12,541,056 B2
(45) Date of Patent: Feb. 3, 2026

(54) MODE FIELD ADAPTER FOR OPTICAL COUPLING OF WAVEGUIDES

(71) Applicant: DENSELIGHT SEMICONDUCTORS PTE LTD, Singapore (SG)

(72) Inventors: Ter Hoe Loh, Singapore (SG); Yee Loy Lam, Singapore (SG)

(73) Assignee: DENSELIGHT SEMICONDUCTORS PTE LTD, Singapore (SG)

( * ) Notice: Subject to any disclaimer, the term of this patent is extended or adjusted under 35 U.S.C. 154(b) by 637 days.

(21) Appl. No.: 17/817,361

(22) Filed: Aug. 4, 2022

(65) Prior Publication Data

US 2023/0043322 A1 Feb. 9, 2023

Related U.S. Application Data

(60) Provisional application No. 63/229,351, filed on Aug. 4, 2021.

(51) Int. Cl.
G02B 6/122 (2006.01)

(52) U.S. Cl.
CPC .................... G02B 6/1228 (2013.01)

(58) Field of Classification Search
CPC ..................................... G02B 6/1228
USPC .......................................... 385/43
See application file for complete search history.

(56) References Cited

U.S. PATENT DOCUMENTS

| | | | | |
|---|---|---|---|---|
| 10,502,895 B2* | 12/2019 | Shi | | G02B 6/1228 |
| 10,536,219 B1* | 1/2020 | Doerr | | G02B 6/00 |
| 12,019,286 B2* | 6/2024 | Horth | | G02B 6/4206 |
| 12,259,579 B1* | 3/2025 | Dudley | | G02B 6/305 |
| 2003/0007719 A1* | 1/2003 | Forrest | | G02B 6/12004 |
| | | | | 385/14 |
| 2004/0105476 A1* | 6/2004 | Wasserbauer | | H01S 5/026 |
| | | | | 372/50.22 |
| 2013/0016942 A1* | 1/2013 | Gubenko | | H01S 5/1064 |
| | | | | 977/932 |
| 2018/0180818 A1* | 6/2018 | Jiang | | G02B 6/1228 |
| 2020/0132936 A1* | 4/2020 | Evans | | G02B 6/262 |
| 2020/0233149 A1* | 7/2020 | Park | | G02B 6/13 |

(Continued)

OTHER PUBLICATIONS

Xiaochen Sun, Lingxuan Zhang, Qihao Zhang, and Wenfu Zhang, "Si Photonics for Practical LiDAR Solutions", Silicon Photonics—Emerging Devices and Applications, Applied science 9(20), 4225, Oct. 10, 2019.

(Continued)

*Primary Examiner* — Kaveh C Kianni
(74) *Attorney, Agent, or Firm* — CHIP Law Group

(57) ABSTRACT

A mode field adapter (MFA) is disclosed. The MFA is tapered and includes a passive core region and an active core region separated by a distance. Further, the passive core region includes first and second passive layers that are separated by another distance. The MFA is configured to receive an optical signal from a first waveguide, and alter, for transmission to a second waveguide, an optical mode of the optical signal. The optical mode is altered based on the distance between the first and second passive layers, the distance between the active and passive core regions, and the tapering of the MFA. The optical mode is altered such that an optical loss associated with the optical signal traversing from the first waveguide to the second waveguide by way of the MFA is within a tolerance limit.

10 Claims, 9 Drawing Sheets

(56) References Cited

U.S. PATENT DOCUMENTS

| | | | |
|---|---|---|---|
| 2020/0241203 A1* | 7/2020 | Liu | G02B 5/18 |
| 2020/0313397 A1* | 10/2020 | Jung | H01S 5/3406 |
| 2021/0048721 A1* | 2/2021 | Wang | G02F 1/225 |
| 2021/0126429 A1* | 4/2021 | Venkatesan | G02B 6/4201 |

OTHER PUBLICATIONS

I. Moerman, P.P. Van Daele, and P.M. Demeester, "A review on fabrication technologies for the monolithic Integration of tapers with III-V semiconductor devices", IEEE Journal of Selected Topics in Quantum Electronics, Dec. 1997, pp. 1308-1320, vol. 3, Issue. 6, IEEE.

Gyeongho Son, Seungjun Han, Jongwoo Park, Kyungmok Kwon and Kyoungsik Yu, "High-efficiency broadband light coupling between optical fibers and photonic integrated circuits", Nanophotonics, Oct. 20, 2018, pp. 1845-1864, vol. 7, Issue. 12, Degruyter.

Boum'Edienne Mersali, Abderrahim Ramdane, and Alain Carenco, "Optical-mode transformer: a III-V circuit integration enabler", IEEE Journal of Selected Topics in Quantum Electronics, Dec. 1997, pp. 1321-1331, vol. 3, Issue. 6, IEEE.

V. Vusirikala, S. S. Saini, R. E. Bartolo, S. Agarwala, R. D. Whaley, F. G. Johnson, D. R. Stone, and M. Dagenais, "1.55-um InGaAsP—InP Laser Arrays with Integrated-Mode Expanders Fabricated Using a Single Epitaxial Growth", IEEE Journal of Selected Topics in Quantum Electronics, Dec. 1997, pp. 1332-1343, vol. 3, Issue. 6, IEEE.

G. Allen Vawter, Charles T. Sullivan, Joel R. Wendt, Robert E. Smith, Hong Q. Hou, and John F. Klem, "Tapered Rib Adiabatic Following Fiber Couplers in Etched GaAs Materials for Monolithic Spot-Size Transformation", IEEE Journal of Selected Topics in Quantum Electronics, Dec. 1997, pp. 1361-1371, vol. 3, Issue. 6, IEEE.

Masahiro Aoki, Masaaki Komori, Hiroshi Sato, Tomonobu Tsuchiya, Akira Taike, Makoto Takahashi, Kazuhisa Uomi, and Shinji Tsuji, "Reliable Wide-Temperature-Range Operation of 1.3-um Beam-Expander Integrated Laser Diode for Passively Aligned Optical Modules", IEEE Journal of Selected Topics in Quantum Electronics, Dec. 1997, pp. 1405-1412, vol. 3, Issue. 6, IEEE.

H. Bissessur, C. Graver, O. Le Gouezigou, G. Michaud, and F. Gaborit, "Ridge Laser with Spot-Size Converter in a Single Epitaxial Step for High Coupling Efficiency to Single-Mode Fibers", IEEE Photonics Technology Letters, Sep. 1998, pp. 1235-1237, vol. 10, Issue. 9, IEEE.

L. Schares, R. Budd, D. Kuchta, F. Doany, C. Schow, M. Möhrle, A. Sigmund, W. Rehbein, "Etched-facet semiconductor optical amplifiers for gain-integrated photonic switch fabrics", 2015 European Conference on Optical Communication (ECOC), Dec. 3, 2015, IEEE, Valencia, Spain.

Fuad E. Doany, Russell Budd, Laurent Schares, Tam Huynh, Michael Wood, Daniel Kuchta, Nicolas Dupuis, Clinit Schow, Benjamin Lee, M. Moehrle, A. Sigmund, W. Rehbein, T. Y. Liow, L. W. Luo, and G. Q. Lo, "A Four-Channel Silicon Photonic Carrier with Flip-Chip Integrated Semiconductor Optical Amplifier (SOA) Array Providing >10-dB Gain", 2016 IEEE 66th Electronic Components and Technology Conference (ECTC), Aug. 18, 2016, IEEE, Las Vegas, NV, USA.

Takeshi Matsumoto, Teruo Kurahashi, Ryotaro Konoike, Keijiro Suzuki, Ken Tanizawa, Ayahito Uetake, Kazumasa Takabayashi, Kazuhiro Ikeda, Hitoshi Kawashima, Suguru Akiyama, and Shigeaki Sekiguchi, "Hybrid-Integration of SOA on Silicon Photonics Platform Based on Flip-Chip Bonding", Journal of Lightwave Technology, Sep. 13, 2018, pp. 307-313, vol. 37, Issue. 2, IEEE.

Chung-En Zah, Rajaram Bhat, Bhadresh N. Pathak, F. Favire, Wei Lin, M. C. Wang, Nicholas C. Andreadakis, D. M. Hwang, M. A. Koza, Tien-Pei Lee, Zheng Wang, David Darby, Dale Flanders, and J. James Heieh, "High-performance uncooled 1.3-/spI mu/m Al/sub x/Ga/sub y/In/sub 1−x−y/As/InP strained-layer quantum-well lasers for subscriber loop applications", IEEE Journal of Quantum Electronics, Feb. 1994, pp. 511-523, vol. 30, Issue. 2, IEEE.

T. R. Chen, P. C. Chen, J. Ungar, M. A. Newkirk, S. Oh, and N. Bar-Chaim, "Low-threshold and high-temperature operation of InGaAlAs—InP lasers", IEEE Photonics Technology Letters, Jan. 1997, pp. 17-18, vol. 9, Issue. 1, IEEE.

Jinyan Jin, Jing Shi, and Decheng Tian, "Study on high-temperature performances of 1.3-μm InGaAsP—InP strained multiquantum-well buried-heterostructure lasers", IEEE Photonics Technology Letters, Jan. 24, 2005, pp. 276-278, vol. 17, Issue. 2, IEEE.

Hiroyasu Mawatari, Mitsuo Fukuda, Shin-Ichi Matsumoto, Kenji Kishi, and Yoshio Itaya, "Reliability and degradation behaviors of semi-insulating Fe-doped InP buried heterostructure lasers fabricated by RIE and MOVPE", Journal of Lightwave Technology, Mar. 1997, pp. 534-537, vol. 15, Issue. 3, IEEE.

Fang Wu, Valery I. Tolstikhin, Adam Densmore, and Serge Grabtchak, "Two-step lateral taper spot-size converter for efficient fiber coupling to InP-based photonic integrated circuits", Proceedings of SPIE—The International Society for Optical Engineering, Oct. 2004.

Chris G. H. Roeloffzen, Marcel Hoekman, Edwin J. Klein, Lennart S. Wevers, Roelof Bernardus Timens, Denys Marchenko, Dimitri Geskus, Ronald Dekker, Andrea Alippi, Robert Grootjans, Albert Van Rees, Ruud M. Oldenbeuving, Jorn P. Epping, Ren'e G. Heideman, Kerstin Worhoff, Arne Leinse, Douwe Geuzebroek, Erik Schreuder, Paulus W. L. Van Dijk, Ilka Visscher, Caterina Taddei, Youwen Fan, Caterina Taballione, Yang Liu, David Marpaung, "Low Loss Sig. Tri ple X Optical Waveguide", Teee Jurnal of Selected Topics, Aug. 2018.

M. Theurer, M. Moehrle, A. Sigmund, K.-O. Velthaus, R. M. Oldenbeuving, L. Wevers, F. M. Postma, R. Mateman, F. Schreuder, D. Geskus, K. Wörhoff, R. Dekker, R. G. Heideman, and M. Schell, "Flip-Chip Integration of InP and SiN", IEEE Photonics Technology Letters, Jan. 13, 2019, pp. 273-276, vol. 31, Issue. 3, IEEE.

International Search Report and Written Opinion for PCT Application No. PCT/IB2022/057168 mailed on Nov. 16, 2022, pp. 7.

* cited by examiner

MODE FIELD ADAPTER FOR OPTICAL COUPLING OF WAVEGUIDES

CROSS-REFERENCE TO RELATED APPLICATIONS/INCORPORATION BY REFERENCE

This patent application makes reference to, claims priority to, and claims the benefit of U.S. Provisional Application No. 63/229,351, filed Aug. 4, 2021, the contents of which are hereby incorporated herein by reference in its entirety.

FIELD OF THE DISCLOSURE

Various embodiments of the present disclosure relate generally to optical communication. More particularly, various embodiments of the present disclosure relate to a mode field adapter for optical coupling of waveguides.

BACKGROUND

Silicon is a major element used in silicon photonic devices. However, as silicon is an indirect band-gap semiconductor, the silicon photonic devices are typically incapable of providing optical emission and/or optical gain. Consequently, photonic integrated circuits (PICs) capable of optical emission and/or optical gain (e.g., a laser, a semiconductor optical amplifier, or the like) are required to be integrated with the silicon photonic devices. Wafer-level integration of the PICs is a costly endeavor. Hence, a PIC is butt-coupled to a silicon photonic device in a flip-chip manner post-fabrication. In such a scenario, a waveguide of the PIC is optically coupled to a waveguide of the silicon photonic device such that an optical signal generated or amplified by the waveguide of the PIC traverses to the waveguide of the silicon photonic device. However, there may be a significant mismatch between optical modes associated with the waveguide of the PIC and the waveguide of the silicon photonic device. Such a mismatch may lead to an inefficient optical coupling between the two waveguides and the loss of the optical signal. The optical performance of the silicon photonic device may thus be degraded.

Limitations and disadvantages of conventional and traditional approaches will become apparent to one of skill in the art, through comparison of described systems with some aspects of the present disclosure, as set forth in the remainder of the present application and with reference to the drawings.

SUMMARY

Mode field adapters for optical coupling of waveguides are provided substantially as shown in, and described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
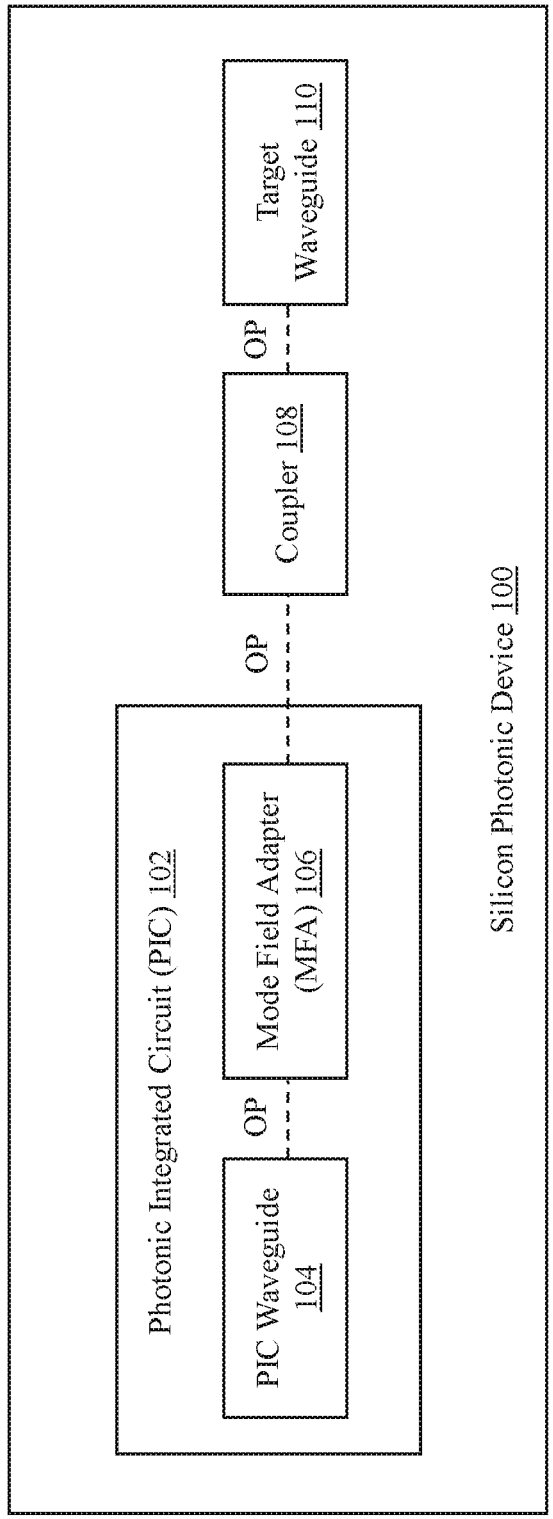
FIG. 1 is a schematic block diagram that illustrates a silicon photonic device, in accordance with an exemplary embodiment of the present disclosure.

Certain embodiments of the disclosure may be found in the disclosed mode field adapter (MFA). The MFA may include a waveguide structure that is tapered. The waveguide structure may be configured to receive an optical signal from a first waveguide. Further, the waveguide structure may be configured to alter an optical mode of the optical signal traversing along the waveguide structure for transmission to a second waveguide. The waveguide structure may include a passive core region and an active core region that are separated by a first distance. Further, the passive core region may include a first passive layer and a second passive layer that are separated by a second distance. The optical mode is altered based on the first distance between the active core region and the passive core region, the second distance between the first passive layer and the second passive layer, and the tapering of the waveguide structure. The optical mode is altered such that an optical loss associated with the optical signal traversing from the first waveguide to the second waveguide by way of the MFA is within a first tolerance limit.

Certain embodiments of the disclosure may be found in the disclosed photonic integrated circuit (PIC). The PIC may include a waveguide structure that is divided into a first part and a second part. The first part of the waveguide structure has a constant width and corresponds to a PIC waveguide of the PIC, whereas the second part of the waveguide structure is tapered and corresponds to an MFA of the PIC. The waveguide structure may include a passive core region and an active core region that are separated by a first distance. Further, the passive core region may include a first passive layer and a second passive layer that are separated by a second distance. When an optical signal traverses through the MFA, an optical mode of the optical signal is altered as compared to the optical mode of the optical signal in the PIC waveguide. The optical mode is altered based on the first distance between the active core region and the passive core region, the second distance between the first passive layer and the second passive layer, and the tapering of the MFA. Further, the altered optical mode facilitates optical coupling of the PIC to the target waveguide such that an optical loss associated with the optical signal traversing from the PIC waveguide to the target waveguide by way of the MFA is within a first tolerance limit.

Certain embodiments of the disclosure may be found in the disclosed silicon photonic device. The silicon photonic device may include a target waveguide and a PIC. The PIC may include a waveguide structure that is divided into a first part and a second part. The first part of the waveguide structure has a constant width and corresponds to a PIC waveguide of the PIC, whereas the second part of the waveguide structure is tapered and corresponds to an MFA of the PIC. The waveguide structure may include a passive core region and an active core region that are separated by a first distance. Further, the passive core region may include a first passive layer and a second passive layer that are separated by a second distance. When an optical signal traverses through the MFA, an optical mode of the optical signal is altered as compared to the optical mode of the optical signal in the PIC waveguide. The optical mode is altered based on the first distance between the active core region and the passive core region, the second distance between the first passive layer and the second passive layer, and the tapering of the MFA. The altered optical mode facilitates optical coupling of the PIC to the target waveguide such that an optical loss associated with the optical signal traversing from the PIC waveguide to the target waveguide by way of the MFA is within a first tolerance limit.

In some embodiments, the optical signal that is received from the first waveguide (e.g., the PIC waveguide) is confined in the active core region. Further, along the waveguide structure of the MFA, the optical signal transits from the active core region to the passive core region. The transition of the optical signal from the active core region to the passive core region results in the alteration of the optical mode.

In some embodiments, the optical mode is altered further based on a thickness of the first passive layer and a thickness of the second passive layer.

In some embodiments, the waveguide structure may further include a first spacer layer, and the passive core region may further include a second spacer layer. The first spacer layer is formed on the second passive layer, and the active core region is formed on the first spacer layer. The second spacer layer is formed on the first passive layer, and the second passive layer is formed on the second spacer layer. A thickness of the first spacer layer is equal to the first distance and a thickness of the second spacer layer is equal to the second distance.

In some embodiments, the active core region, the first spacer layer, and the passive core region may correspond to a mesa portion of the waveguide structure. The waveguide structure may further include a ridge portion formed on the mesa portion. The mesa portion tapers from a first width to a second width, whereas the ridge portion tapers from a third width to a fourth width. The tapering of the waveguide structure corresponds to the tapering of the mesa portion and the ridge portion.

In some embodiments, the active core region, the first spacer layer, and the second passive layer may correspond to a mesa portion of the waveguide structure. The mesa portion tapers from a first width to a second width. The waveguide structure may further include a ridge portion formed on the mesa portion. The ridge portion tapers from a third width to a fourth width. The tapering of the waveguide structure corresponds to the tapering of the mesa portion and the ridge portion.

In some embodiments, the MFA may further include a substrate. The first passive layer of the waveguide structure is formed on the substrate.

In some embodiments, the waveguide structure may be further configured to transmit the optical signal with the altered optical mode to a coupler of the second waveguide (e.g., the target waveguide). The optical mode of the optical signal is altered based on an optical mode associated with a coupler of the second waveguide such that the optical loss is within the first tolerance limit when the optical signal traverses from the MFA to the coupler.

In some embodiments, the optical mode of the optical signal is altered such that a difference between a near-field profile of the altered optical mode and a near-field profile of the optical mode associated with the coupler is within a second tolerance limit. The optical mode of the optical signal is further altered such that a difference between a far-field profile of the altered optical mode and a far-field profile of the optical mode associated with the coupler is within a third tolerance limit.

In some embodiments, the mesa portion corresponding to the PIC waveguide has a first width and the mesa portion corresponding to the MFA is an extension of the mesa portion corresponding to the PIC waveguide and tapers from the first width to a second width. Further, the ridge portion corresponding to the PIC waveguide has a third width and the ridge portion corresponding to the MFA is an extension of the ridge portion corresponding to the PIC waveguide and tapers from the third width to a fourth width.

In some embodiments, a facet of the MFA is inclined with respect to a plane of the PIC. To couple the MFA to the coupler, the waveguide structure may further include an etch region formed between the facet of the MFA and the plane of the PIC.

Thus, in the present disclosure, the PIC waveguide of the PIC and the target waveguide of the silicon photonic device are coupled by way of the MFA and the coupler. In such a scenario, the MFA alters the optical mode of the optical signal such that when the optical signal traverses from the MFA to the coupler, an optical loss of the optical signal is within the first tolerance limit. As a result, the optical loss of the optical signal traversing from the MFA to the coupler in the silicon photonic device of the present disclosure is significantly less than that in a conventional silicon photonic device where waveguides are directly coupled. In other words, the coupling efficiency between the PIC waveguide and the target waveguide in the silicon photonic device of the present disclosure is significantly greater than that in the conventional silicon photonic device. Thus, the optical performance of the silicon photonic device of the present disclosure is significantly greater than that of the conventional silicon photonic device.

FIG. 1 is a schematic block diagram that illustrates a silicon photonic device, in accordance with an exemplary embodiment of the present disclosure. Referring to FIG. 1, there is shown a silicon photonic device 100 that may include a photonic integrated circuit (PIC) 102 integrated therewith (e.g., butt-coupled thereto) in a flip-chip manner. The PIC 102 may correspond to an active semiconductor device that is butt-coupled to the silicon photonic device 100 to provide optical emission and/or optical gain. The PIC 102 may include a PIC waveguide 104 and a mode field adapter (MFA) 106 formed as an extension of the PIC waveguide 104. On the other hand, the silicon photonic device 100 may correspond to a silicon photonic platform (SiPh) and may further include various silicon-on-insulator and/or silicon-nitrate-on-insulator waveguides and couplers attached to such waveguides for facilitating coupling thereto. For example, as illustrated in FIG. 1, the silicon photonic device 100 may further include a coupler 108 and a target waveguide 110, where the coupler 108 is attached to the target waveguide 110 for facilitating coupling thereto. The flip-chip bonding of the PIC 102 on the silicon photonic device 100 corresponds to optical coupling of the PIC waveguide 104 to the target waveguide 110 by way of the MFA 106 and the coupler 108.

The PIC 102 may be formed using III-V semiconductors such as indium phosphide (InP), gallium arsenide (GaAs), indium gallium arsenide phosphide (InGaAsP), aluminum gallium indium arsenide (AlGaInAs), or the like. For the sake of ongoing discussion, it is assumed that the PIC 102 is a light-emitting device (e.g., a laser) butt-coupled to the silicon photonic device 100 for optical emission. In such a scenario, the PIC 102 is configured to generate an optical signal OP. For example, the PIC waveguide 104 may include various gratings (not shown) formed thereon that facilitate the generation of the optical signal OP. A wavelength of the optical signal OP may be in O-band (e.g., 1300-1399 nanometers) or C-band (e.g., 1500-1599 nanometers).

The optical signal OP may traverse through the PIC waveguide 104. As the MFA 106 is an extension of the PIC waveguide 104, the optical signal OP may further traverse from the PIC waveguide 104 to the MFA 106. The PIC waveguide 104 has a uniform structure (e.g., a constant width and a constant height), whereas the MFA 106 has a tapering structure (e.g., a tapering width and a constant height). When the optical signal OP traverses through the MFA 106, the tapering structure of the MFA 106 ensures that an optical mode of the optical signal OP is altered (e.g., expanded) as compared to the optical mode of the optical signal OP in the PIC waveguide 104. The optical mode may correspond to a conduit through which the optical signal OP is guided while traversing. Thus, the MFA 106 may be configured to receive the optical signal OP from the PIC waveguide 104 at an input port (not shown) thereof. As the optical signal OP traverses along the MFA 106, the MFA 106 may be further configured to alter the optical mode of the optical signal OP based on the tapering structure thereof, and output the optical signal OP with the altered optical mode at an output port (not shown) of the MFA 106. The optical mode of the optical signal OP is altered to facilitate bonding of the PIC 102 on the silicon photonic device 100 in an efficient manner (e.g., such that an optical loss of the optical signal OP traversing from the PIC waveguide 104 to other components of the silicon photonic device 100 by way of the MFA 106 is within a first tolerance limit). In an example, the first tolerance limit is 1 decibel (dB). However, the first tolerance limit may have other values in other embodiments.

The MFA 106 may be further coupled to the coupler 108. In other words, the output port of the MFA 106 may be coupled to an input port (not shown) of the coupler 108. Further, the MFA 106 may be configured to transmit the optical signal OP with the altered optical mode to the coupler 108. As the PIC 102 is to be coupled to the coupler 108, the MFA 106 is structured such that the MFA 106 alters the optical mode of the optical signal OP based on an optical mode associated with the coupler 108 (e.g., an optical mode at the input port of the coupler 108). For example, the optical mode of the optical signal OP is altered such that the optical loss associated with the optical signal OP is within the first tolerance limit when the optical signal OP traverses from the MFA 106 to the coupler 108. In other words, the altered optical mode substantially matches (e.g., within some tolerance limits) the optical mode associated with the coupler 108.

The matching of the optical modes is performed based on two parameters, namely, near-field and far-field profiles. Thus, the optical mode of the optical signal OP is altered such that a difference between a near-field profile of the altered optical mode and a near-field profile of the optical mode associated with the coupler 108 is within a second tolerance limit, and a difference between a far-field profile of the altered optical mode and a far-field profile of the optical mode associated with the coupler 108 is within a third tolerance limit. The near-field profile corresponds to characteristics of the optical signal OP near (e.g., within a predefined distance of) the output port of the MFA 106, and the far-field profile corresponds to characteristics of the optical signal OP away from the output port.

Each of the near-field and far-field profiles has a horizontal value and a vertical value. As a result, each of the second and third tolerance limits may have a horizontal tolerance value and a vertical tolerance value. Thus, the optical mode of the optical signal OP is altered such that a difference between the horizontal and vertical values of the near-field profile of the altered optical mode and the horizontal and vertical values of the near-field profile of the optical mode associated with the coupler 108 is within the horizontal and vertical tolerance values of the second tolerance limit, respectively. Similarly, the optical mode of the optical signal OP is altered such that a difference between the horizontal and vertical values of the far-field profile of the altered optical mode and the horizontal and vertical values of the far-field profile of the optical mode associated with the coupler 108 is within the horizontal and vertical tolerance values of the third tolerance limit, respectively. In an example, the horizontal and vertical tolerance values of the second tolerance limit correspond to 1.1 micrometers ($\mu$m) and 0.5 $\mu$m, respectively, whereas each of the horizontal and vertical tolerance values of the third tolerance limit corresponds to 3°. Thus, if the near-filed and far-field profiles of the optical mode associated with the coupler 108 are equal to 4.3 $\mu$m(h)×4 $\mu$m(v) and 13.2° (h)×14.6° (v), respectively, and the MFA 106 alters the optical mode such that the near-filed and far-field profiles of the altered optical mode are equal to 4.6 $\mu$m(h)×4.3 $\mu$m(v) and 16° (h)×16.3° (v), respectively, the PIC 102 may be considered to be butt-coupled to the silicon photonic device 100 in an efficient manner. The notations '(h)' and '(v)' correspond to horizontal and vertical values, respectively. It will be apparent to a person skilled in the art that the above-mentioned values of the second and third tolerance limits are non-limiting. The second and third tolerance limits may have other values in other embodiments.

The coupler 108 may be further configured to alter (e.g., contract) the optical mode of the received optical signal OP for traversing through the target waveguide 110. In an example, the coupler 108 corresponds to a die-edge coupler (DEC). The optical signal OP thus traverses from the PIC waveguide 104 to the target waveguide 110 by way of the MFA 106 and the coupler 108.

The target waveguide 110 may be further coupled to a target optical circuit (not shown) of the silicon photonic device 100. The target waveguide 110 may be configured to transmit the optical signal OP to the target optical circuit. Further, the target optical circuit may utilize the optical signal OP for various applications (e.g., optical communications, photonic computing, or the like).

The scope of the present disclosure is not limited to the PIC 102 including a single PIC waveguide (e.g., the PIC waveguide 104). In various other embodiments, the PIC 102 may include multiple PIC waveguides operating in a similar manner as the PIC waveguide 104, without deviating from the scope of the present disclosure. In such a scenario, each PIC waveguide may be coupled to an associated MFA, operating in a similar manner as the MFA 106.

Although it is described that the MFA 106 is coupled to the target waveguide 110 by way of the coupler 108, the scope of the present disclosure is not limited to it. In various other embodiments, the MFA 106 may be directly coupled to the target waveguide 110, without deviating from the scope of the present disclosure. In such a scenario, the MFA 106 alters the optical mode based on an optical mode associated with the target waveguide 110.

The scope of the present disclosure is not limited to the coupler 108 being a DEC. In various other embodiments, other types (e.g., a fiber-edge coupler) of the coupler 108 may be utilized, without deviating from the scope of the present disclosure.

Although it is described that the PIC 102 corresponds to a laser, the scope of the present disclosure is not limited to it. In various other embodiments, the PIC 102 may correspond to other light-emitting devices, such as an electro-absorption modulator laser, a Mach-Zehnder modulator, an external cavity laser, or the like, without deviating from the scope of the present disclosure. In each scenario, the structure and the function of the PIC 102 remain the same as described above.

The scope of the present disclosure is not limited to the PIC 102 being a light-emitting device. In various other embodiments, the PIC 102 may correspond to light-amplifying devices butt-coupled to the silicon photonic device 100 for providing optical gain, without deviating from the scope of the present disclosure. Examples of such a PIC 102 may include a semiconductor optical amplifier, a gain chip, or the like.

Although it is described that the MFA 106 is attached at one end of the PIC waveguide 104, the scope of the present disclosure is not limited to it. In various other embodiments, two MFAs, operating in a similar manner as the MFA 106, may be coupled to both ends of the PIC waveguide 104. In such a scenario, one MFA may receive the optical signal OP from another waveguide (not shown) of the silicon photonic device 100 and the other MFA may transmit the optical signal OP (e.g., an amplified version of the optical signal OP) to the target waveguide 110.

Figure 2:
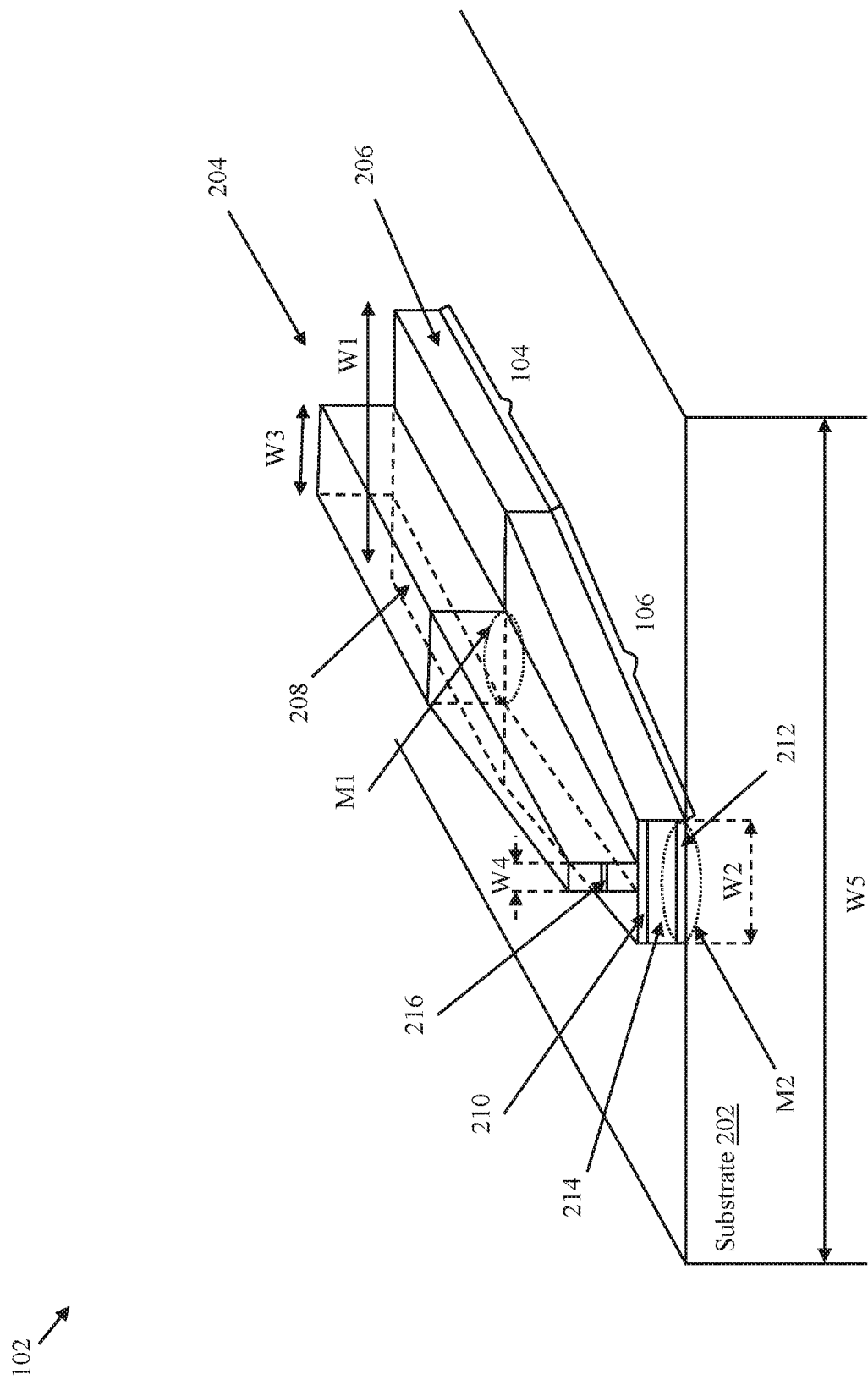
FIG. 2 is a schematic diagram that illustrates a perspective view of a photonic integrated circuit (PIC) of the silicon photonic device of FIG. 1, in accordance with an exemplary embodiment of the present disclosure.

FIG. 2 is a schematic diagram that illustrates a perspective view of the PIC of the silicon photonic device of FIG. 1, in accordance with an exemplary embodiment of the present disclosure. Referring to FIG. 2, there is shown a perspective view of the PIC 102. The PIC 102 may include a substrate 202 The substrate 202 may correspond to a surface upon which semiconductor structures are formed. The substrate 202 may include InP, GaAs, silicon, silica-on-silicon, silica, silica-on-polymer, glass, a metal, a ceramic, a polymer, or a combination thereof. In an embodiment, the substrate 202 is an n-type substrate.

The PIC 102 may further include a waveguide structure 204 that is formed on the substrate 202. The waveguide structure 204 may facilitate the generation of the optical signal OP in the PIC 102 and the transmission of the optical signal OP to the target waveguide 110. The waveguide structure 204 is divided into a first part and a second part.

The first part of the waveguide structure 204 has constant width and height (e.g., is uniform) and corresponds to the PIC waveguide 104, whereas the second part of the waveguide structure 204 has a tapering width and a constant height (e.g., is tapered) and corresponds to the MFA 106. In other words, the PIC waveguide 104 and the MFA 106 correspond to waveguide structures (e.g., parts thereof) that are configured to execute various operations of the PIC 102. For the sake of ongoing discussion, it is assumed that the PIC waveguide 104 and the MFA 106 are fabricated as a whole. However, the scope of the present disclosure is not limited to it. In an alternate embodiment, the MFA 106 is attached to the PIC waveguide 104 post the fabrication of the PIC waveguide 104.

The waveguide structure 204 may include a mesa portion 206 that may be formed on the substrate 202. The mesa portion 206 may be formed using semiconductor compounds such as GaAsP, InP, or the like. The waveguide structure 204 may further include a ridge portion 208 formed on the mesa portion 206. The ridge portion 208 may correspond to an InP layer. The mesa portion 206 facilitates transverse light guiding, whereas the ridge portion 208 facilitates lateral light guiding with a higher refractive index core. The PIC 102 thus corresponds to a ridge-waveguide laser. Further, the mesa and ridge portions 206 and 208 are formed in both parts of the waveguide structure 204 (e.g., the PIC waveguide 104 and the MFA 106). For example, a sub-portion of the mesa portion 206 and a sub-portion of the ridge portion 208 correspond to the PIC waveguide 104, whereas another sub-portion of the mesa portion 206 and another sub-portion of the ridge portion 208 correspond to the MFA 106.

The mesa portion 206 corresponding to the PIC waveguide 104 has a first width W1 (e.g., a constant width). Further, the mesa portion 206 corresponding to the MFA 106 is an extension of the mesa portion 206 corresponding to the PIC waveguide 104 and tapers from the first width W1 to a second width W2. In other words, the mesa portion 206 corresponding to the MFA 106 has a tapering width. In an example, the first width W1 is equal to 9 µm and the second width W2 is equal to 4.8 µm. However, the first width W1 and the second width W2 may have other values in other embodiments. Similarly, the ridge portion 208 corresponding to the PIC waveguide 104 has a third width W3 (e.g., a constant width) and the ridge portion 208 corresponding to the MFA 106 is an extension of the ridge portion 208 corresponding to the PIC waveguide 104 and tapers from the third width W3 to a fourth width W4. In other words, the ridge portion 208 corresponding to the MFA 106 has a tapering width. In an example, the third width W3 is equal to 2 µm and the fourth width W2 is equal to 0.7 µm. However, the third width W3 and the fourth width W4 may have other values in other embodiments. Further, the third width W3 may be less than the first width W1, and the fourth width W4 may be less than the second width W2. The tapering of the MFA 106 thus corresponds to the tapering of the mesa portion 206 and the ridge portion 208 corresponding to the MFA 106. Further, the mesa portion 206 and the ridge portion 208 corresponding to the MFA 106 tapers along a length of the MFA 106. In an example, the tapering length of the MFA 106 (e.g., the mesa portion 206 and the ridge portion 208 corresponding to the MFA 106) is equal to 200 µm. However, the tapering length may have other values in other embodiments.

The substrate 202, the mesa portion 206, and the ridge portion 208 may be formed such that a width of the substrate 202 (e.g., a fifth width W5) may be greater than the width of the mesa portion 206, and the width of the mesa portion 206 may be greater than the width of the ridge portion 208. Thus, the mesa portion 206 is formed by etching associated layers up to the substrate 202, and the ridge portion 208 portion is formed by etching associated layers up to the mesa portion 206. A portion of the substrate 202 which is sans the mesa portion 206 may be called a trench region (shown later in FIG. 4A). The trench region may provide optical isolation to the optical signal OP in the PIC 102.

The mesa portion 206 may include an active core region 210, a passive core region 212, and a first spacer layer 214. The passive core region 212 may be formed on the substrate 202. The passive core region 212 may be formed using various semiconductor compounds such as InGaAsP, InP, or the like. The first spacer layer 214 may be formed on the passive core region 212. In an embodiment, the first spacer layer 214 corresponds to an InP layer. Further, the active core region 210 may be formed on the first spacer layer 214. The active core region 210 may be formed using InGaAsP/InP or AlGaInAs/InP multiple quantum well active layers that facilitate the generation of the optical signal OP. In an embodiment, a thickness of the active core region 210 may be equal to a thickness of the passive core region 212. In another embodiment, the thickness of the active core region 210 may be different from the thickness of the passive core region 212. Further, the active core region 210 is separated from the passive core region 212 by a first distance D1. In other words, a thickness of the first spacer layer 214 may be equal to a first distance D1. In an example, the first distance D1 is equal to 1.25 μm. However, the first distance D1 may have other values in other embodiments.

Each of the active core region 210, the passive core region 212, and the first spacer layer 214 formed in the mesa portion 206 corresponding to the PIC waveguide 104 has the first width W1 that is constant throughout a length of the PIC waveguide 104. Similarly, each of the active core region 210, the passive core region 212, and the first spacer layer 214 formed in the mesa portion 206 corresponding to the MFA 106 has a tapering width (e.g., tapers from the first width W1 to the second width W2) along the length of the MFA 106.

As the PIC 102 corresponds to a laser, the ridge portion 208 may include a grating layer 216 (e.g., splitting the InP layer into two parts) for providing distributed feedback and enabling the generation of the optical signal OP. Although FIG. 2 illustrates that the ridge portion 208 includes the grating layer 216, the scope of the present disclosure is not limited to it. In cases where the PIC 102 is not a laser, the ridge portion 208 may be sans the grating layer 216.

When the optical signal OP is traversing in the PIC waveguide 104, the optical signal OP has a particular optical mode. The optical mode of the optical signal OP in the PIC waveguide 104 is hereinafter referred to as a "first optical mode M1". Thus, the optical signal OP has the first optical mode M1 at the interface between the PIC waveguide 104 and the MFA 106 (e.g., at the input port of the MFA 106). Further, in the PIC waveguide 104, the optical signal OP is confined in the active core region 210. In other words, the optical signal OP that is received by the MFA 106 from the PIC waveguide 104 is confined in the active core region 210.

The tapering of the mesa and ridge portions 206 and 208 corresponding to the MFA 106 ensures that the confinement factor of the active core region 210 corresponding to the MFA 106 is less than the confinement factor of the active core region 210 corresponding to the PIC waveguide 104. The confinement factor of the active core region 210 is indicative of a degree of retention of the optical signal OP in the active core region 210. The reduced confinement factor ensures that, as the optical signal OP traverses along the MFA 106, the optical signal OP transits from the active core region 210 corresponding to the MFA 106 to the passive core region 212 corresponding to the MFA 106. The transition of the optical signal OP from the active core region 210 to the passive core region 212 results in alteration of the optical mode of the optical signal OP. Further, the layer arrangement in the mesa portion 206 controls the dimensions of the altered optical mode.

The optical mode of the optical signal OP is thus altered based on the tapering of the mesa and ridge portions 206 and 208 corresponding to the MFA 106 and the layer arrangement in the mesa portion 206. The altered optical mode of the optical signal OP is hereinafter referred to as a "second optical mode M2". The optical mode of the optical signal OP is thus altered from the first optical mode M1 to the second optical mode M2. In other words, the waveguide structure of the MFA 106 may be configured to receive the optical signal OP from the PIC waveguide 104 (e.g., a first waveguide). Further, for transmission to the target waveguide 110 (e.g., a second waveguide), the waveguide structure of the MFA 106 may be configured to alter the optical mode of the optical signal OP traversing along the waveguide structure. The waveguide structure of the MFA 106 may be further configured to transmit the optical signal OP with the second optical mode M2 (e.g., the altered optical mode) to the coupler 108 of the target waveguide 110.

As the MFA 106 is to be coupled to the coupler 108, the second optical mode M2 may be modified based on the optical mode associated with the coupler 108 (e.g., the optical mode at the input port of the coupler 108). The second optical mode M2 may be modified based on the modification of at least one of the first distance D1, the thickness of the passive core region 212, the second width W2, and the fourth width W4. The second optical mode M2 may substantially match (e.g., within some tolerance limits) the optical mode associated with the coupler 108.

The optical signal OP with the second optical mode M2 thus traverses from the MFA 106 to the coupler 108, and in turn, to the target waveguide 110. The second optical mode M2 thus facilitates optical coupling of the PIC 102 to the target waveguide 110 such that the optical loss associated with the optical signal OP traversing from the PIC waveguide 104 to the target waveguide 110 by way of the MFA 106 and the coupler 108 is within the first tolerance limit. Further, to improve the optical coupling of the MFA 106 to the coupler 108, anti-reflection coating on a facet (shown later in FIG. 6) of the MFA 106 (e.g., where the output port of the MFA 106 is formed) and index matching fluid (e.g., having a refractive index of 1.4338) between the MFA 106 and the coupler 108 may be utilized.

Figure 3:
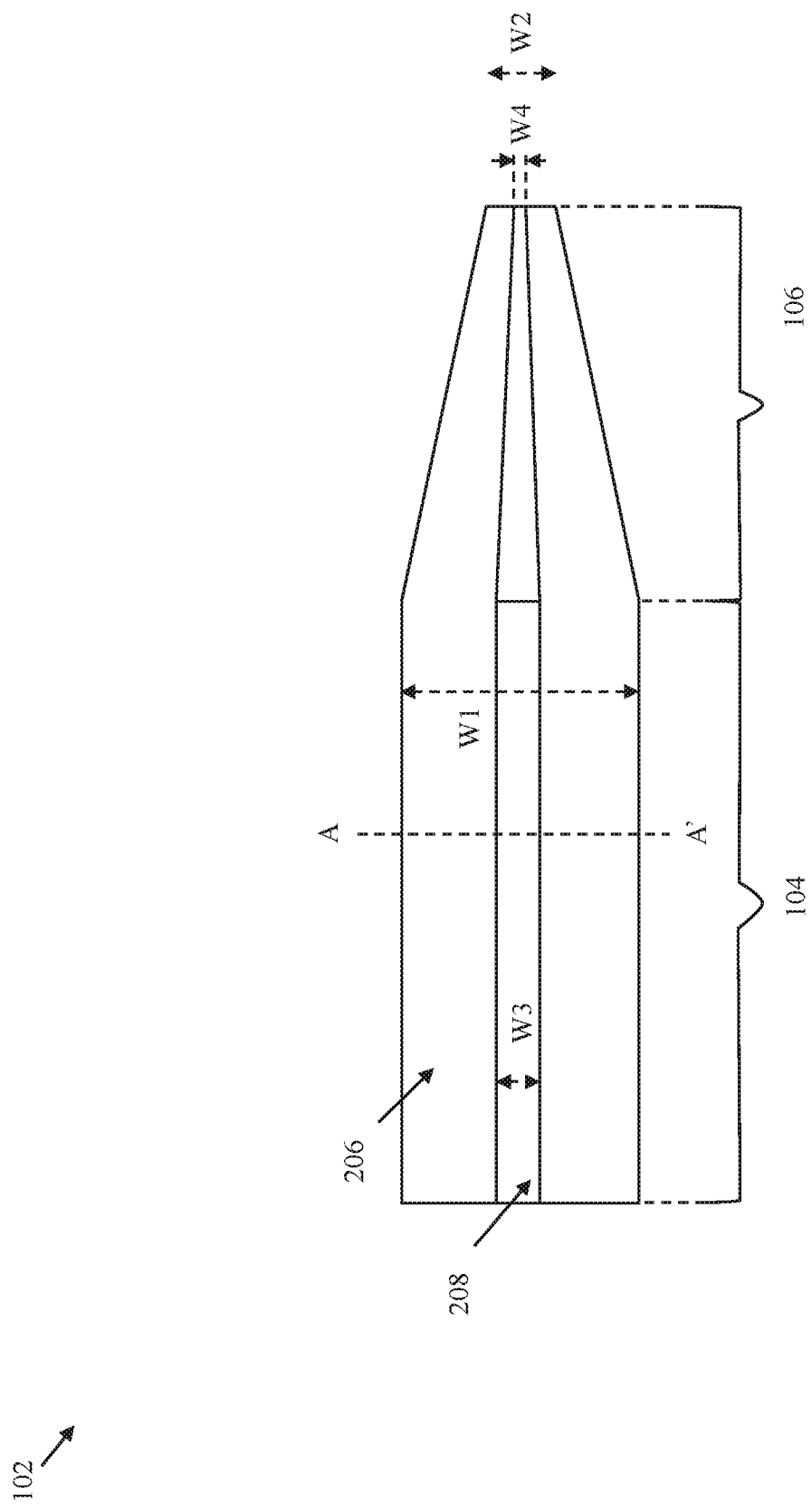
FIG. 3 is a schematic diagram that illustrates a top view of the PIC, in accordance with an exemplary embodiment of the present disclosure.

FIG. 3 is a schematic diagram that illustrates a top view of the PIC, in accordance with an exemplary embodiment of the present disclosure. Referring to FIG. 3, there is shown a top view of the PIC 102. The PIC 102 may include the mesa and ridge portions 206 and 208 corresponding to the PIC waveguide 104 and the mesa and ridge portions 206 and 208 corresponding to the MFA 106. Although not shown, it will be apparent to a person skilled in the art that the trench region may be present adjacent to the mesa portion 206.

As illustrated in FIG. 3, the mesa and ridge portions 206 and 208 corresponding to the PIC waveguide 104 have the first width W1 and the third width W3, respectively. The third width W3 is less than the first width W1. The width of each of the mesa and ridge portions 206 and 208 corresponding to the PIC waveguide 104 may remain constant throughout the length of the PIC waveguide 104. The MFA 106 is formed as an extension to the PIC waveguide 104. In other words, the mesa and ridge portions 206 and 208 corresponding to the MFA 106 may be formed as extensions to the mesa and ridge portions 206 and 208 corresponding to the PIC waveguide 104, respectively. Further, the mesa and ridge portions 206 and 208 corresponding to the MFA 106 may be tapered. For example, the mesa portion 206 corresponding to the MFA 106 may taper from the first width W1 to the second width W2 along the length of the MFA 106. Similarly, the ridge portion 208 corresponding to the MFA 106 may taper from the third width W3 to the fourth width W4 along the length of the MFA 106.

Figure 4A:
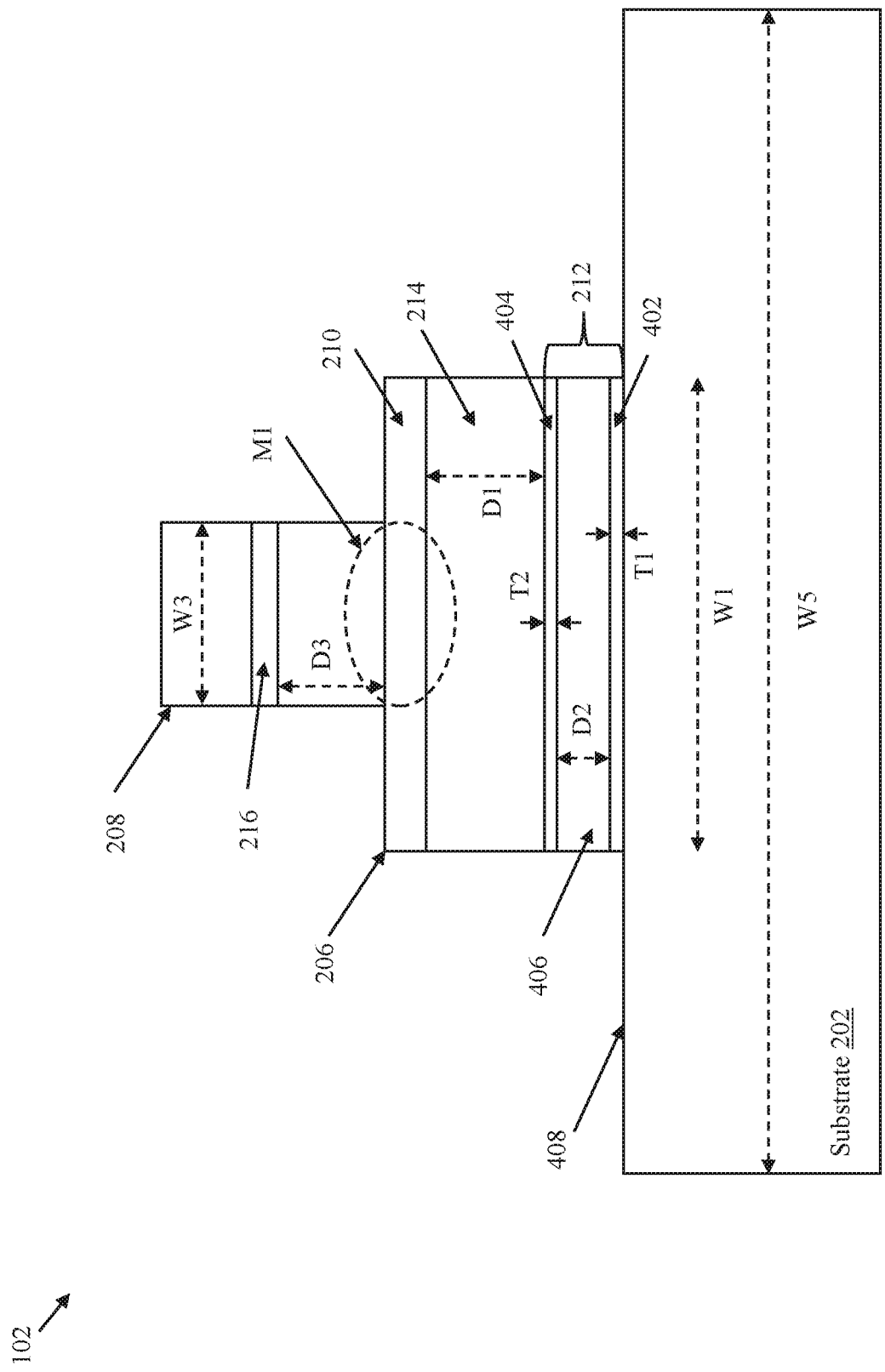
FIG. 4A is a schematic diagram that illustrates a cross-sectional view of the PIC, in accordance with an exemplary embodiment of the present disclosure.

FIG. 4A is a schematic diagram that illustrates a cross-sectional view of the PIC, in accordance with an exemplary embodiment of the present disclosure. Referring to FIG. 4A, there is shown a cross-sectional view of the PIC 102. The cross-sectional view corresponds to a view of a cross-section across the A-A' axis shown in FIG. 3. The cross-sectional view thus corresponds to the PIC waveguide 104.

As illustrated in FIG. 4A, the passive core region 212 may be formed on the substrate 202. The passive core region 212 may include a first passive layer 402, a second passive layer 404, and a second spacer layer 406. In an embodiment, each of the first and second passive layers 402 and 404 corresponds to an InGaAsP layer, and the second spacer layer 406 corresponds to an InP layer.

The first passive layer 402 may be formed on the substrate 202. The second spacer layer 406 may be formed on the first passive layer 402, and the second passive layer 404 may be formed on the second spacer layer 406. The first and second passive layers 402 and 404 are separated by a second distance D2. In other words, a thickness of the second spacer layer 406 is equal to the second distance D2. In an example, the second distance D2 is equal to 0.1 µm. However, the second distance D2 may have other values in other embodiments. Further, a thickness of the first passive layer 402 is hereinafter referred to as a "first thickness T1", and a thickness of the second passive layer 404 is hereinafter referred to as a "second thickness T2". The second thickness T2 may be equal to the first thickness T1. In an example, each of the first thickness T1 and the second thickness T2 is equal to 0.05 µm. However, the first thickness T1 and the second thickness T2 may have other values in other embodiments. The scope of the present disclosure is not limited to the second thickness T2 being equal to the first thickness T1. In an alternate embodiment, the second thickness T2 may be different from the first thickness T1.

The thickness of the passive core region 212 may be such that optical absorption is reduced and an increase in the cathode-layer component of a forward voltage of the PIC 102 (e.g., the laser) is prevented. The first and second passive layers 402 and 404 and the second spacer layer 406 may be n-doped in a manner that further reduces the optical absorption. Further, the bandgap of each of the first and second passive layers 402 and 404 is transparent to wavelengths in the O-band and the C-band.

Although it is described that the passive core region 212 includes two passive layers separated by a spacer layer, in an alternate embodiment, the passive core region 212 may correspond to a single passive layer.

The first spacer layer 214 may be formed on the second passive layer 404. Further, the active core region 210 may be formed on the first spacer layer 214. The active core region 210 and the second passive layer 404 are thus separated by the first distance D1.

The active core region 210, the first spacer layer 214, the first passive layer 402, the second spacer layer 406, and the second passive layer 404 may correspond to the mesa portion 206. Thus, the active core region 210, the first spacer layer 214, the first passive layer 402, the second spacer layer 406, and the second passive layer 404 may have the first width W1.

The ridge portion 208 corresponding to the PIC waveguide 104 may be formed on the mesa portion 206 corresponding to the PIC waveguide 104 (e.g., the active core region 210). The ridge portion 208 may have the third width W3. Further, the ridge portion 208 may include the grating layer 216. The grating layer 216 may be formed at a third distance D3 from the active core region 210. In an example, the third distance D3 is equal to 0.25 µm. However, the third distance D3 may have other values in other embodiments.

The optical signal OP that traverses through the PIC waveguide 104 may be confined to the active core region 210. Such optical signal OP has the first optical mode M1. As illustrated in FIG. 4A, the first optical mode M1 is predominant over the active core region 210, and further extends to the first spacer layer 214 and the ridge portion 208 corresponding to the PIC waveguide 104. Further, the first optical mode M1 is horizontally confined by the width of the ridge portion 208 (e.g., the third width W3). In other words, the first optical mode M1 has the third width W3.

The substrate 202 may have the fifth width W5 that remains constant through the PIC waveguide 104. The fifth width W5 may be greater than the first width W1 and the third width W3. In an example, the fifth width W5 is equal to 250 µm. However, the fifth width W5 may have other values in other embodiments. In such a scenario, the region on the substrate 202 that is sans the mesa portion 206 may correspond to the trench region (hereinafter designated as the "trench region 408"). The trench region 408 may provide the optical isolation to the optical signal OP in the PIC 102.

Figure 4B:
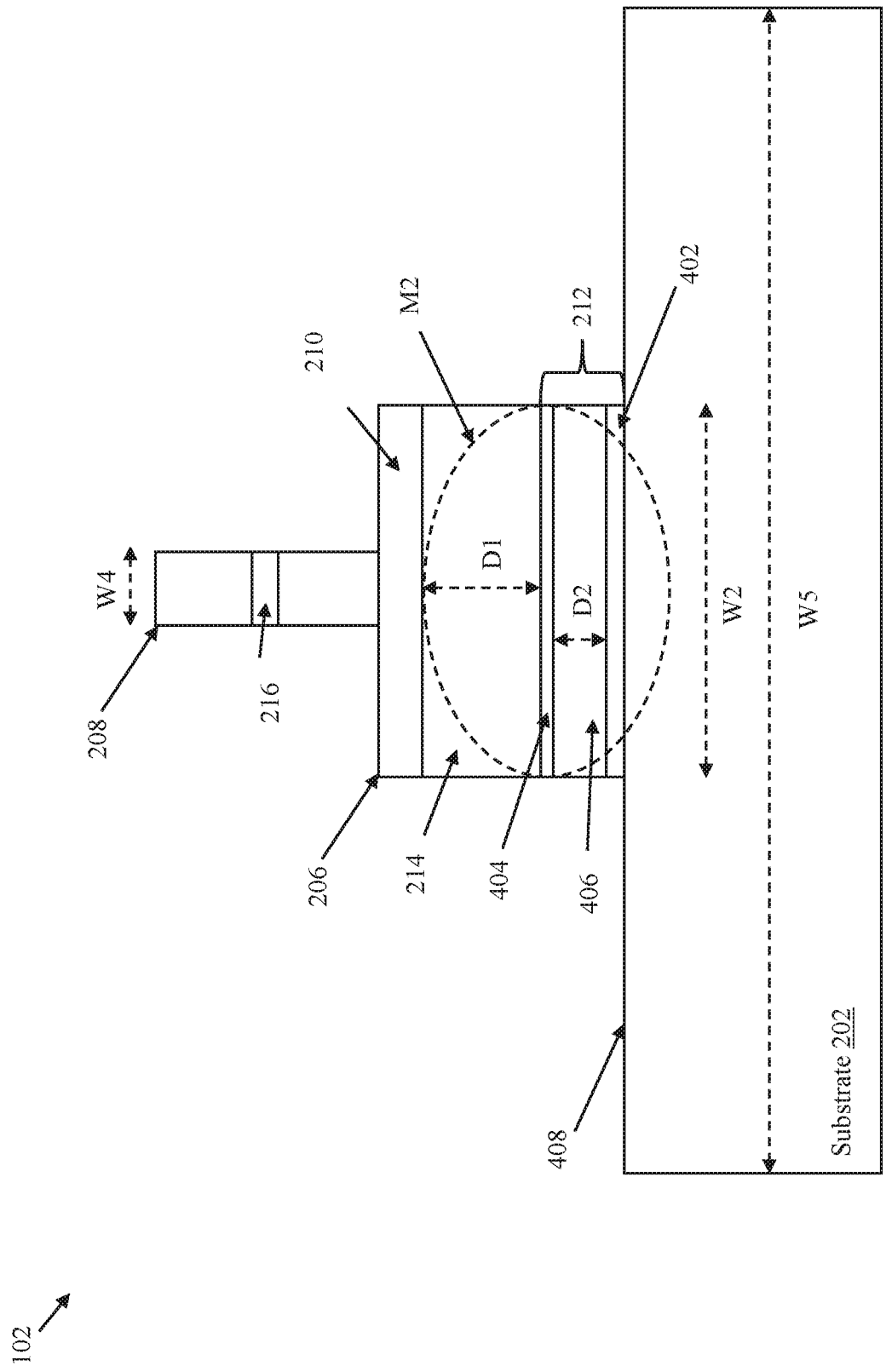
FIG. 4B is a schematic diagram that illustrates a front view of the PIC, in accordance with an exemplary embodiment of the present disclosure.

FIG. 4B is a schematic diagram that illustrates a front view of the PIC, in accordance with an exemplary embodiment of the present disclosure. Referring to FIG. 4B, there is shown a front view of the PIC 102. The front view illustrates the interface including the output port of the MFA 106 that is to be coupled to the coupler 108.

The formation of the passive core region 212 on the substrate 202, the layer arrangement of the mesa portion 206 corresponding to the MFA 106, and the formation of the ridge portion 208 corresponding to the MFA 106 on the mesa portion 206 corresponding to the MFA 106 remain same as illustrated in FIG. 4A. However, as the front view illustrates the output port of the MFA 106, the mesa and ridge portions 206 and 208 corresponding to the MFA 106 are tapered. In other words, the active core region 210, the passive core region 212, and the first spacer layer 214 may have the second width W2, and the ridge portion 208 may have the fourth width W4. The thickness of each layer of the MFA 106 remains the same as that in the PIC waveguide 104.

The tapering of the mesa and ridge portions 206 and 208 corresponding to the MFA 106 results in the transition of the optical signal OP to the passive core region 212. The transition of the optical signal OP results in the alteration of the optical mode of the optical signal OP. Further, the layer arrangement of the mesa portion 206 controls the dimensions of the altered optical mode based on (e.g., to substantially match) the optical mode associated with the coupler 108. Thus, the optical mode of the optical signal OP is altered based on the tapering of the MFA 106, the first distance D1 between the active core region 210 and the passive core region 212, the second distance D2 between the first and second passive layers 402 and 404, the first thickness T1 of the first passive layer 402, and the second thickness T2 of the second passive layer 404. Hence, the altered optical mode may be designed to have the near-field and far-field profiles substantially matching (e.g., within some tolerance limits) that of the optical mode associated with the coupler 108. The altered optical mode (e.g., the second optical mode M2) may be designed by modifying at least one of the second width W2, the fourth width W4, the second distance D2, the first thickness T1, the second thickness T2, and the first distance D1. In other words, the PIC 102 can be adapted to couple to the coupler 108 of the target waveguide 110 without causing significant fabrication and performance changes to the original design of the PIC 102.

As illustrated in FIG. 4B, the second optical mode M2 extends vertically from the bottom of the active core region 210 into the first spacer layer 214 and the passive core region 212, and further below the first passive layer 402. Further, the second optical mode M2 is horizontally confined by the width of the mesa portion 206 (e.g., the second width W2). In other words, the second optical mode M2 has the second width W2.

Although it is described that the MFA 106 has a constant height, the scope of the invention is not limited to it. In various other embodiments, the height of the MFA 106 (e.g., the thickness of each of the mesa and ridge portions 206 and 208 corresponding to the MFA 106) may also vary, without deviating from the scope of the present disclosure.

The scope of the present disclosure is not limited to the first and second passive layers 402 and 404 having the same width (e.g., the first width W1 in the PIC waveguide 104 and the second width W2 in the MFA 106). In various other embodiments, the width of the first passive layer 402 may be different from the width of the second passive layer 404. An example of such a PIC 102 is illustrated in FIGS. 5A and 5B.

Figure 5A:
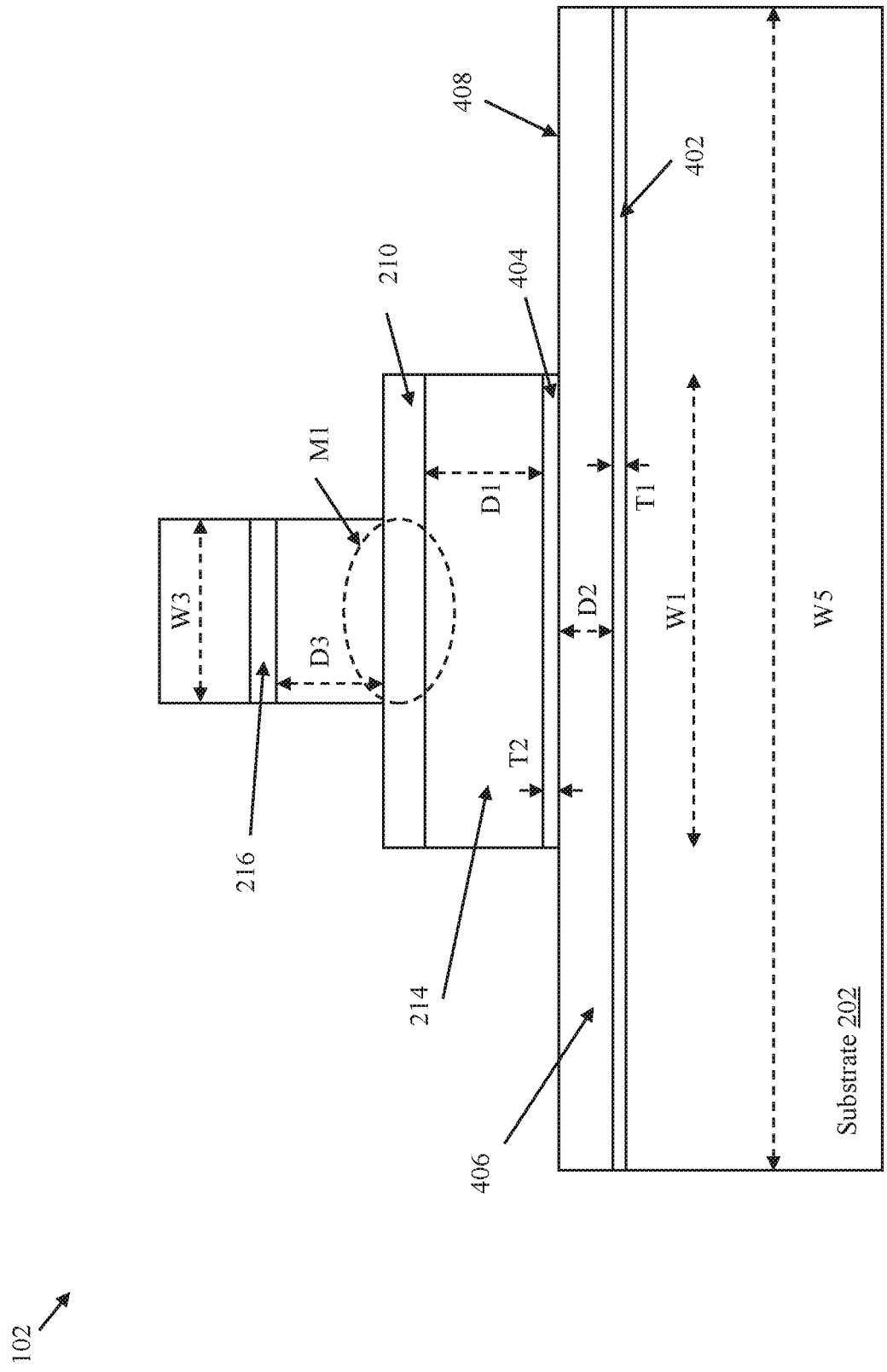
FIG. 5A is a schematic diagram that illustrates the cross-sectional view of the PIC, in accordance with another exemplary embodiment of the present disclosure.

FIG. 5A is a schematic diagram that illustrates the cross-sectional view of the PIC, in accordance with another exemplary embodiment of the present disclosure. Referring to FIG. 5A, there is shown the cross-sectional view of the PIC 102. The cross-sectional view corresponds to the PIC waveguide 104.

The difference between the PIC 102 illustrated in FIG. 4A and the PIC 102 illustrated in FIG. 5A is the width of the first passive layer 402 and the width of the second spacer layer 406. For example, the first passive layer 402 and the second spacer layer 406 have the same width as the second passive layer 404 in the PIC 102 of FIG. 4A, whereas in the PIC 102 of FIG. 5A, the first passive layer 402 and the second spacer layer 406 have the same width as the substrate 202. In other words, the first passive layer 402 and the second spacer layer 406 are not etched during the formation of the mesa portion 206 corresponding to the PIC waveguide 104. Thus, the mesa portion 206 corresponding to the PIC waveguide 104 may exclusively include the active core region 210, the first spacer layer 214, and the second passive layer 404 (e.g., is sans the first passive layer 402 and the second spacer layer 406). In other words, the active core region 210, the first spacer layer 214, and the second passive layer 404 may correspond to the mesa portion 206 and may have the first width W1, whereas the first passive layer 402, the second spacer layer 406, and the substrate 202 may have the fifth width W5. The width of the ridge portion 208 corresponding to the PIC waveguide 104, the thickness of each layer in the PIC waveguide 104, and the first optical mode M1 remain the same as illustrated in the PIC 102 of FIG. 4A.

Figure 5B:
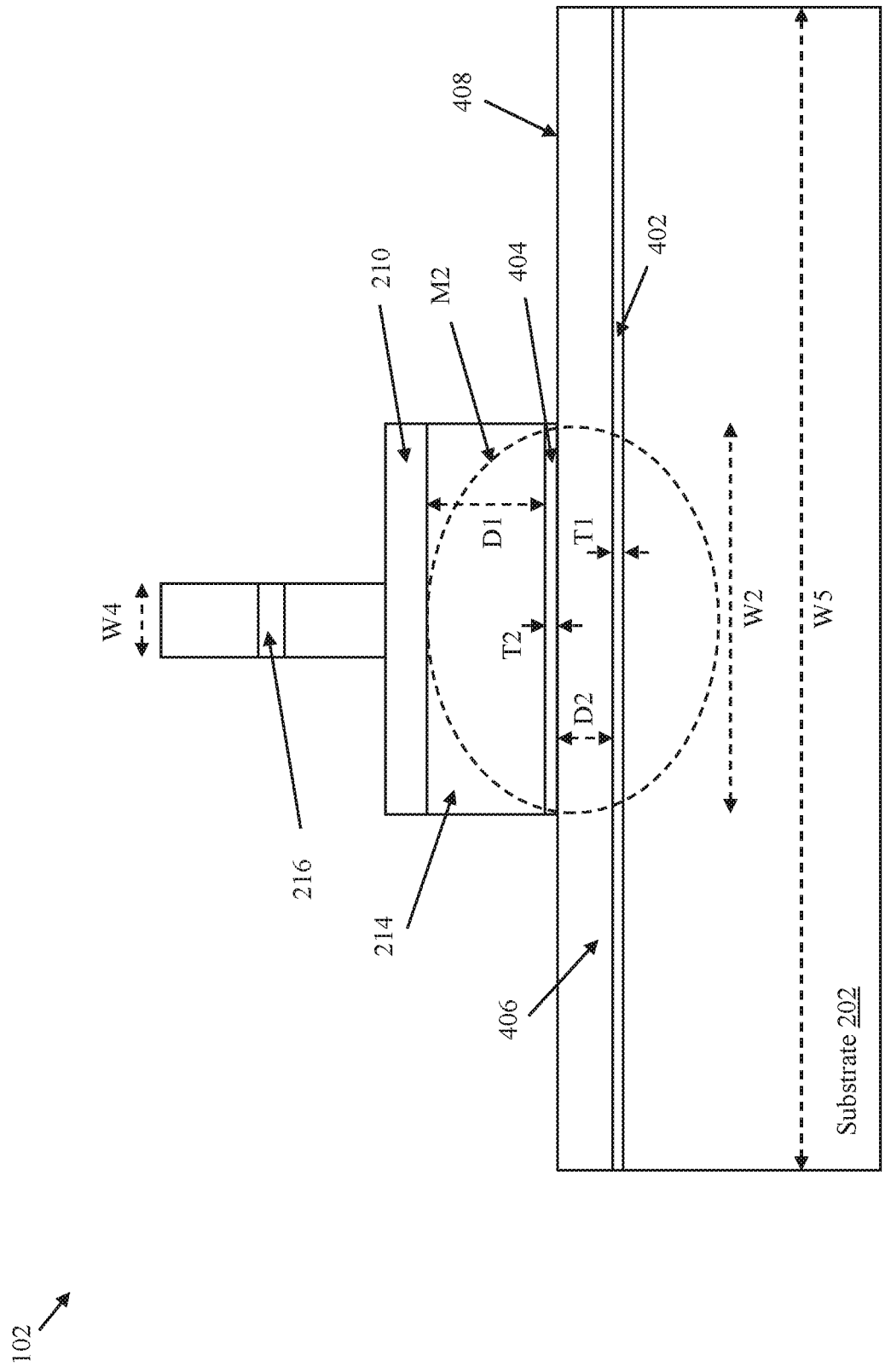
FIG. 5B is a schematic diagram that illustrates the front view of the PIC, in accordance with another exemplary embodiment of the present disclosure.

FIG. 5B is a schematic diagram that illustrates the front view of the PIC, in accordance with another exemplary embodiment of the present disclosure. Referring to FIG. 5B, there is shown the front view of the PIC 102. The front view illustrates the interface including the output port of the MFA 106 that is to be coupled to the coupler 108.

The difference between the PIC 102 of FIG. 4B and the PIC 102 of FIG. 5B is the width of the first passive layer 402 and the width of the second spacer layer 406. For example, the first passive layer 402 and the second spacer layer 406 have the same width as the second passive layer 404 in the PIC 102 of FIG. 4B, whereas in the PIC 102 of FIG. 5B, the first passive layer 402 and the second spacer layer 406 have the same width as the substrate 202. In other words, the first passive layer 402 and the second spacer layer 406 are not etched during the formation of the mesa portion 206 corresponding to the MFA 106. Thus, the mesa portion 206 corresponding to the MFA 106 may exclusively include the active core region 210, the first spacer layer 214, and the second passive layer 404 (e.g., is sans the first passive layer 402 and the second spacer layer 406). In other words, the active core region 210, the first spacer layer 214, and the second passive layer 404 may correspond to the mesa portion 206 and may have the second width W2, whereas the first passive layer 402, the second spacer layer 406, and the substrate 202 may have the fifth width W5. The width of the ridge portion 208 corresponding to the MFA 106, the thickness of each layer in the MFA 106, and the second optical mode M2 remain the same as illustrated in the PIC 102 of FIG. 4B.

Figure 6:
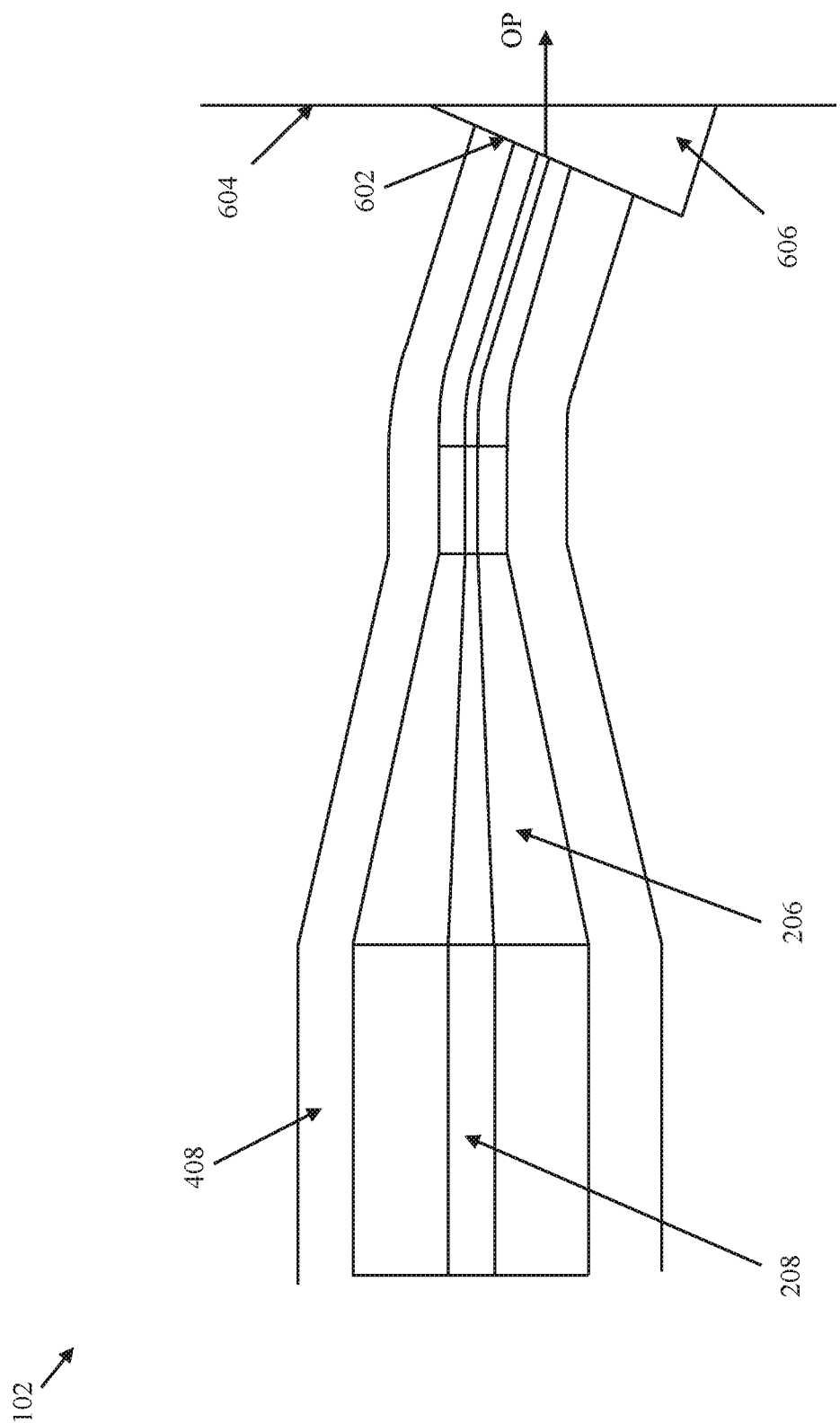
FIG. 6 is a schematic diagram that illustrates the top view of the PIC, in accordance with yet another exemplary embodiment of the present disclosure.

FIG. 6 is a schematic diagram that illustrates the top view of the PIC, in accordance with yet another exemplary embodiment of the present disclosure. Referring to FIG. 6, there is shown the top view of the PIC 102. In the PIC 102 illustrated in FIGS. 2 and 3, the facet (hereinafter designated as the "facet 602") of the MFA 106 (e.g., the facet 602 where the output port of the MFA 106 is formed) is assumed to be perpendicular to the input port of the coupler 108. However, the scope of the present disclosure is not limited to it. In an alternate embodiment, the facet 602 of the MFA 106 may be inclined with respect to a plane 604 (e.g., a cleavage plane) of the PIC 102 (e.g., the input port of the coupler 108) to mitigate back reflections. In such a scenario, to couple the MFA 106 to the coupler 108, the waveguide structure 204 may further include an etch region 606 formed between the facet 602 of the MFA 106 and the plane 604 of the PIC 102. The etch region 606 may ensure that the optical signal OP traversing through the inclined MFA 106 is outputted perpendicular to the plane 604 of the PIC 102. Further, the formation of the mesa and ridge portions 206 and 208 and the alteration in the optical mode of the optical signal OP remain the same as described in FIG. 2.

The PIC 102 illustrated in FIGS. 2, 4A, 4B, 5A, and 5B has a mid-index contrast (MIC) ridge configuration. The scope of the present disclosure is however not limited to it. In various embodiments, the PIC 102 may have other configurations, without deviating from the scope of the present disclosure. Two such configurations are illustrated below in FIG. 7 and FIG. 8.

Figure 7:
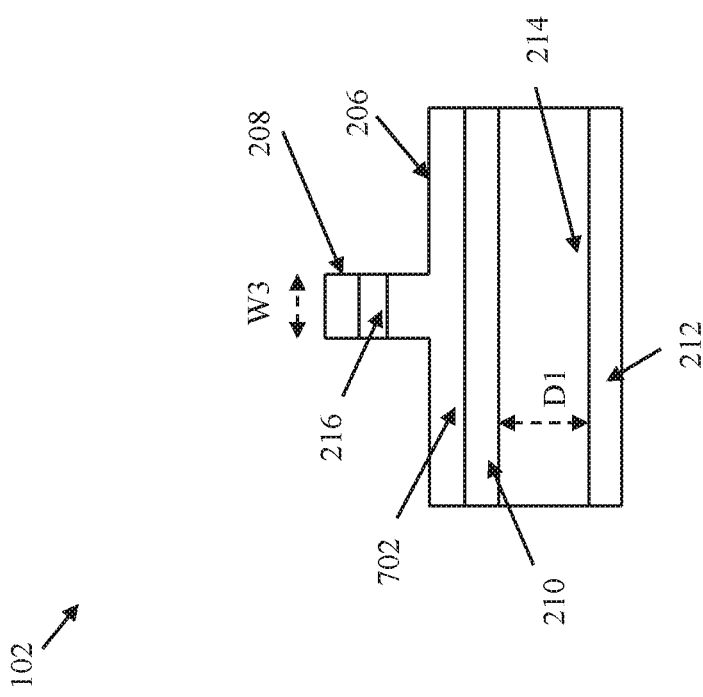
FIG. 7 is a schematic diagram that illustrates the cross-sectional view of the PIC, in accordance with yet another exemplary embodiment of the present disclosure.

FIG. 7 is a schematic diagram that illustrates the cross-sectional view of the PIC, in accordance with yet another exemplary embodiment of the present disclosure. Referring to FIG. 7, there is shown the cross-sectional view of the PIC 102. The PIC 102 of FIG. 7 may have a normal ridge (NR) configuration.

The PIC 102 of FIG. 7 is functionally similar to the PIC 102 of FIG. 2. The difference between the PIC 102 of FIG.

7 and the PIC 102 of FIG. 2 is in the layer arrangement of the mesa portion 206. As illustrated in FIG. 7, a third spacer layer 702 (e.g., an InP layer) separates the ridge portion 208 and the active core region 210. In other words, the etching of the ridge portion 208 is not performed up to the active core region 210. Thus, the mesa portion 206 may additionally include the third spacer layer 702 formed on the active core region 210, and the ridge portion 208 is formed on the third spacer layer 702. Further, the third spacer layer 702 in the PIC waveguide 104 may have the first width W1, whereas the third spacer layer 702 in the MFA 106 may have the second width W2. The substrate 202 is not shown in FIG. 7 to make the illustrations concise and clear and should not be considered as a limitation of the present disclosure.

Figure 8:
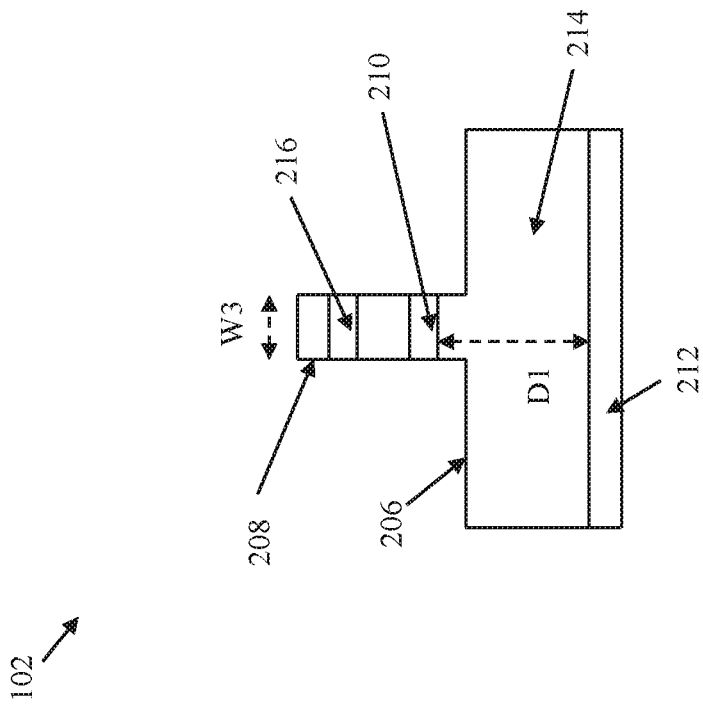
FIG. 8 is a schematic diagram that illustrates the cross-sectional view of the PIC, in accordance with yet another exemplary embodiment of the present disclosure.

FIG. 8 is a schematic diagram that illustrates the cross-sectional view of the PIC, in accordance with yet another exemplary embodiment of the present disclosure. Referring to FIG. 8, there is shown the cross-sectional view of the PIC 102. The PIC 102 of FIG. 8 may have a high-index contrast (HIC) ridge configuration.

The PIC 102 of FIG. 8 is functionally similar to the PIC 102 of FIG. 2. The difference between the PIC 102 of FIG. 8 and the PIC 102 of FIG. 2 is in the layer arrangement of the mesa portion 206 and the ridge portion 208. As illustrated in FIG. 8, the etching of the ridge portion 208 is performed beyond the active core region 210 and into the first spacer layer 214. Thus, the ridge portion 208 includes the active core region 210 and a portion of the first spacer layer 214. Further, the active core region 210 and the portion of the first spacer layer 214 may have the third width W3 in the PIC waveguide 104 and the fourth width W4 in the MFA 106. The substrate 202 is not shown in FIG. 8 to make the illustrations concise and clear and should not be considered as a limitation of the present disclosure.

Various embodiments of the disclosure disclose the silicon photonic device 100. The silicon photonic device 100 may include the PIC 102 butt-coupled thereto in a flip-chip manner. The PIC 102 may include the substrate 202 and the waveguide structure 204 formed on the substrate 202. The waveguide structure 204 may include the passive core region 212 and the active core region 210 separated by the first distance D1. Further, the passive core region 212 may include the first passive layer 402 and the second passive layer 404 separated by the second distance D2. The waveguide structure 204 is divided into the first part that has a constant width and may correspond to the PIC waveguide 104, and the second part that has a tapering width and may correspond to the MFA 106. The MFA 106 is thus an extension to the PIC waveguide 104. When the optical signal OP traverses through the MFA 106, the optical mode of the optical signal OP is altered based on the tapering structure of the MFA 106, the first distance D1, and the second distance D2. In other words, the waveguide structure corresponding to the MFA 106 may be configured to receive the optical signal OP from the PIC waveguide 104, and alter the optical mode of the optical signal OP traversing along the waveguide structure for transmission to the target waveguide 110. The optical mode is altered such that an optical loss associated with the optical signal OP traversing from the PIC waveguide 104 to the target waveguide 110 by way of the MFA 106 is within the first tolerance limit. In other words, the altered optical mode facilitates the optical coupling of the PIC 102 to the target waveguide 110 such that the optical loss associated with the optical signal OP traversing from the PIC waveguide 104 to the target waveguide 110 by way of the MFA 106 is within the first tolerance limit.

The disclosed embodiments encompass numerous advantages. For example, the optical loss of the optical signal OP traversing from the MFA 106 to the coupler 108 in the silicon photonic device 100 is significantly less than that in a conventional silicon photonic device where waveguides are directly coupled. In other words, the coupling efficiency between the PIC waveguide 104 and the target waveguide 110 in the silicon photonic device 100 is significantly greater than that in the conventional silicon photonic device. Thus, the optical performance of the silicon photonic device 100 of the present disclosure is significantly greater than that of the conventional silicon photonic device.

Techniques consistent with the disclosure provide, among other features, mode field adapters for the optical coupling of waveguides. While various exemplary embodiments of the disclosed systems and methods have been described above, it should be understood that they have been presented for purposes of example only, and not limitations. It is not exhaustive and does not limit the disclosure to the precise form disclosed. Modifications and variations are possible in light of the above teachings or may be acquired from practicing the disclosure, without departing from the breadth or scope.

In the claims, the words 'comprising', 'including', and 'having' do not exclude the presence of other elements or steps than those listed in a claim. The terms "a" or "an," as used herein, are defined as one or more than one. Unless stated otherwise, terms such as "first" and "second" are used to arbitrarily distinguish between the elements such terms describe. Thus, these terms are not necessarily intended to indicate temporal or other prioritization of such elements. The fact that certain measures are recited in mutually different claims does not indicate that a combination of these measures cannot be used to advantage.

The invention claimed is:

1. A photonic integrated circuit (PIC), comprising:
a waveguide structure that is divided into a first part that has a constant width and corresponds to a PIC waveguide of the PIC, and a second part that is tapered and corresponds to a mode field adapter (MFA) of the PIC, the waveguide structure comprising:
a passive core region;
a first spacer layer; and
an active core region that is separated from the passive core region by a first distance,
wherein the passive core region comprises;
a first passive layer,
a second spacer layer, and
a second passive layer,
wherein the first spacer layer is formed on the second passive layer, and the active core region is formed on the first spacer layer,
wherein the second spacer layer is formed on the first passive layer and the second passive layer is formed on the second spacer layer,
wherein the first passive layer and the second passive layer are separated by a second distance,
wherein a thickness of the first spacer layer is equal to the first distance and a thickness of the second spacer layer is equal to the second distance,
wherein when an optical signal traverses through the MFA, an optical mode of the optical signal is altered as compared to the optical mode of the optical signal in the PIC waveguide,
wherein the optical mode is altered based on the first distance between the active core region and the passive core region, the second distance between the first passive layer and the second passive layer, and the tapering of the MFA, and wherein the altered optical mode facilitates optical coupling of the PIC to a target waveguide such that an optical loss associated with the optical signal traversing from the PIC waveguide to the target waveguide by way of the MFA is less than a specific value.

2. The PIC of claim 1, wherein in the PIC waveguide, the optical signal is confined in the active core region, wherein in the MFA, the optical signal transits from the active core region to the passive core region based on the tapering of the MFA, and wherein the transition of the optical signal from the active core region to the passive core region results in the alteration of the optical mode.

3. The PIC of claim 1, wherein the optical mode is altered further based on a thickness of the first passive layer and a thickness of the second passive layer.

4. The PIC of claim 1, wherein the active core region, the first spacer layer, and the passive core region correspond to a mesa portion of the waveguide structure, wherein the waveguide structure further comprises a ridge portion formed on the mesa portion, wherein the mesa portion corresponding to the PIC waveguide has a first width and the mesa portion corresponding to the MFA is an extension of the mesa portion corresponding to the PIC waveguide and tapers from the first width to a second width, wherein the ridge portion corresponding to the PIC waveguide has a third width and the ridge portion corresponding to the MFA is an extension of the ridge portion corresponding to the PIC waveguide and tapers from the third width to a fourth width, and wherein the tapering of the MFA corresponds to the tapering of the mesa portion and the ridge portion corresponding to the MFA.

5. The PIC of claim 1, wherein the active core region, the first spacer layer, and the second passive layer correspond to a mesa portion of the waveguide structure, wherein the waveguide structure further comprises a ridge portion formed on the mesa portion, wherein the mesa portion corresponding to the PIC waveguide has a first width and the mesa portion corresponding to the MFA is an extension of the mesa portion corresponding to the PIC waveguide and tapers from the first width to a second width, wherein the ridge portion corresponding to the PIC waveguide has a third width and the ridge portion corresponding to the MFA is an extension of the ridge portion corresponding to the PIC waveguide and tapers from the third width to a fourth width, and wherein the tapering of the MFA corresponds to the tapering of the mesa portion and the ridge portion corresponding to the MFA.

6. The PIC of claim 1, further comprising a substrate, wherein the first passive layer of the waveguide structure is formed on the substrate.

7. The PIC of claim 1, wherein the target waveguide and the PIC waveguide are optically coupled by way of the MFA of the PIC and a coupler of the target waveguide, and wherein the optical mode of the optical signal is further altered based on an optical mode associated with the coupler such that the optical loss associated with the optical signal less than the specific value when the optical signal traverses from the MFA to the coupler.

8. The PIC of claim 7, wherein the optical mode of the optical signal is further altered based on a near-field profile of the optical mode associated with the coupler and a far-field profile of the optical mode associated with the coupler.

9. The PIC of claim 7, wherein a facet of the MFA is inclined with respect to a plane of the PIC, and wherein to couple the MFA to the coupler, the waveguide structure further comprises an etch region formed between the facet of the MFA and the plane of the PIC.

10. A photonic integrated circuit (PIC), comprising:

a waveguide structure that is divided into a first part that has a constant width and corresponds to a PIC waveguide of the PIC, and a second part that is tapered and corresponds to a mode field adapter (MFA) of the PIC, the waveguide structure comprising:

a passive core region;

an active core region that is separated from the passive core region by a first distance, wherein the passive core region comprises a first passive layer and a second passive layer that are separated by a second distance, wherein when an optical signal traverses through the MFA, an optical mode of the optical signal is altered as compared to the optical mode of the optical signal in the PIC waveguide, wherein the PIC waveguide is optically coupled to a target waveguide by way of the MFA of the PIC and a coupler of the target waveguide, wherein the optical mode of the optical signal is altered based on the first distance between the active core region and the passive core region, the second distance between the first passive layer and the second passive layer, the tapering of the MFA, and an optical mode associated with the coupler, wherein the altered optical mode facilitates optical coupling of the PIC to the target waveguide such that an optical loss, associated with the optical signal traversing from the PIC waveguide to the target waveguide by way of the MFA and the coupler, is less than a specific value, and wherein a facet of the MFA is inclined with respect to a plane of the PIC; and an etch region to couple the MFA to the coupler, wherein the etch region is formed between the facet of the MFA and the plane of the PIC.

\* \* \* \* \*